(12) United States Patent
Han et al.

(10) Patent No.: US 11,527,179 B2
(45) Date of Patent: Dec. 13, 2022

(54) DISPLAY DEVICE

(71) Applicant: LG Display Co., Ltd., Seoul (KR)

(72) Inventors: MiJin Han, Gimpo-si (KR); SeungHee Lee, Goyang-si (KR); Hyosung Lee, Gwangmyeong-si (KR)

(73) Assignee: LG Display Co., Ltd., Seoul (KR)

( * ) Notice: Subject to any disclaimer, the term of this patent is extended or adjusted under 35 U.S.C. 154(b) by 0 days.

(21) Appl. No.: 17/462,616

(22) Filed: Aug. 31, 2021

(65) Prior Publication Data

US 2022/0068170 A1 Mar. 3, 2022

(30) Foreign Application Priority Data

Aug. 31, 2020 (KR) ........................ 10-2020-0110640

(51) Int. Cl.
*G09F 9/30* (2006.01)
*G06F 1/16* (2006.01)
(52) U.S. Cl.
CPC ............ *G09F 9/301* (2013.01); *G06F 1/1652* (2013.01); *G06F 1/1656* (2013.01)
(58) Field of Classification Search
CPC ... G09F 9/301; G09F 9/33; G09F 9/35; G06F 1/1624; G06F 1/1637; G06F 1/1652; G06F 1/1656; G06F 2203/04102
See application file for complete search history.

(56) References Cited

U.S. PATENT DOCUMENTS

| | | | | |
|---|---|---|---|---|
| 10,694,625 | B2 * | 6/2020 | Park | H01L 51/524 |
| 11,272,626 | B2 * | 3/2022 | Lee | G06F 1/1601 |
| 2021/0051809 | A1 * | 2/2021 | Song | G06F 1/1652 |
| 2021/0074189 | A1 * | 3/2021 | Kwon | G06F 1/1652 |
| 2021/0142698 | A1 * | 5/2021 | Oh | H01L 51/524 |
| 2021/0200366 | A1 * | 7/2021 | Bok | H01L 27/3234 |
| 2022/0157792 | A1 * | 5/2022 | Huang | H01L 25/0753 |
| 2022/0189347 | A1 * | 6/2022 | Oh | G09F 9/301 |

FOREIGN PATENT DOCUMENTS

| | | |
|---|---|---|
| KR | 10-1966787 B1 | 4/2019 |
| KR | 101966787 B1 * | 4/2019 |
| TW | 201802781 A | 1/2018 |

\* cited by examiner

*Primary Examiner* — Joe H Cheng

(74) *Attorney, Agent, or Firm* — Seed IP Law Group LLP

(57) ABSTRACT

A display device includes a display panel, a roller around which the display panel is wound or unwound, a housing unit which accommodates the display panel and the roller, a head bar connected to one end of the display panel, and a support plate which supports a rear surface of the display panel, has one side fixed to the head bar, and the other side fixed to the housing unit, and forms a mesh pattern.

20 Claims, 12 Drawing Sheets

DISPLAY DEVICE

CROSS-REFERENCE TO RELATED APPLICATIONS

This application claims the priority of Korean Patent Application No. 10-2020-0110640 filed on Aug. 31, 2020, in the Korean Intellectual Property Office, the entire disclosure of which is incorporated herein by reference.

BACKGROUND

Technical Field

The present disclosure relates to a display device, and more particularly, to a rollable display device which is capable of supporting a display panel.

Description of the Related Art

As display devices which are used for a monitor of a computer, a television, or a cellular phone, there are an organic light emitting display device (OLED) which is a self-emitting device and a liquid crystal display device (LCD) which requires a separate light source.

An applicable range of the display device is diversified to personal digital assistants as well as monitors of computers and televisions and a display device with a large display area and a reduced volume and weight is being studied.

Further, recently, a rollable display device is getting attention as a next generation display device.

BRIEF SUMMARY

An object to be achieved by the present disclosure is to provide a display device which disposes a structure which supports a display panel to minimize a problem in that the display panel is not supported when the display panel is wound or unwound.

Another object to be achieved by the present disclosure is to provide a display device which can minimize the twisting of a display panel by means of a support plate when the display device is unwound.

Objects of the present disclosure are not limited to the above-mentioned objects, and other objects, which are not mentioned above, may be clearly understood by those skilled in the art from the following descriptions.

According to an aspect of the present disclosure, a display device includes: a display panel; a roller to which the display panel is wound or unwound; a housing unit which accommodates the display panel and the roller; a head bar connected to one end of the display panel; and a support plate which supports a rear surface of the display panel, has one side fixed to the head bar, and the other side fixed to the housing unit, and forms a mesh pattern. The display device may be manufactured by forming a display unit and a wiring line on a flexible substrate such as plastic which is a flexible material so as to be capable of displaying images even though the display device is rolled.

According to another aspect of the present disclosure, a display device includes: a display panel which displays images; a back cover disposed on a rear surface of the display panel; a roller to which the back cover and the display panel is wound or unwound; a head bar fastened with the back cover; a housing unit which accommodates the display panel, the back cover, and the roller; and a support plate which is fastened with the head bar and the housing unit to support rear surfaces of the display panel and the back cover.

Other detailed matters of the exemplary embodiments are included in the detailed description and the drawings.

According to the present disclosure, a support plate is disposed on a rear surface of the display panel to suppress the bending of the display panel when the display panel is unwound.

According to the present disclosure, the twisting of the support plate is reduced to fix the unwound display panel to be flat.

According to the present disclosure, when the display panel is wound, a shape that the support plate is bent is guided to suppress the support plate from being irregularly bent.

The effects according to the present disclosure are not limited to the contents exemplified above, and more various effects are included in the present disclosure.

BRIEF DESCRIPTION OF THE SEVERAL VIEWS OF THE DRAWINGS

The above and other aspects, features and other advantages of the present disclosure will be more clearly understood from the following detailed description taken in conjunction with the accompanying drawings, in which.

DETAILED DESCRIPTION

Figure 1A:
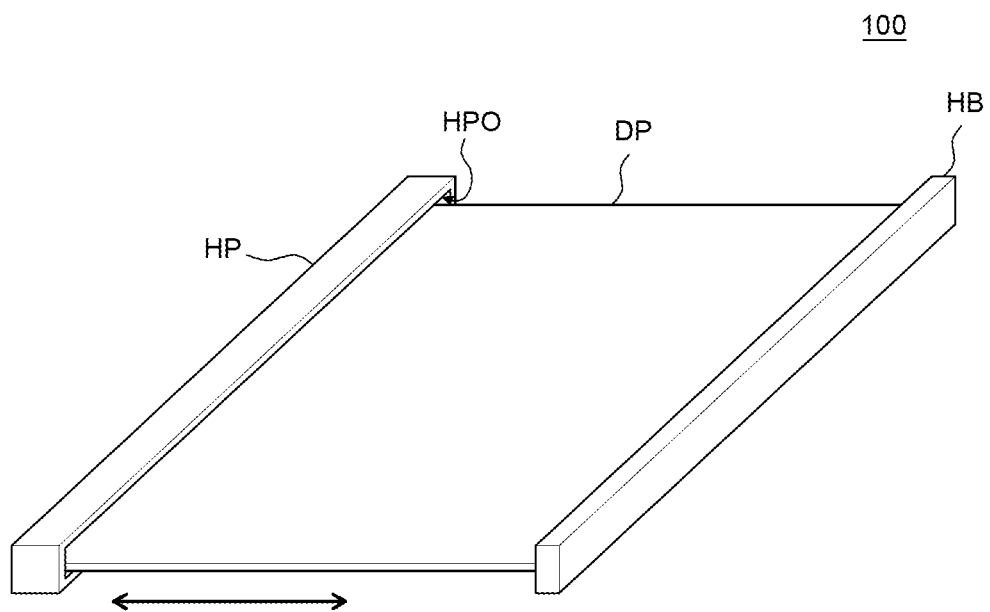
FIGS. 1A and 1B are schematic perspective views of a display device according to an exemplary embodiment of the present disclosure.

Advantages and characteristics of the present disclosure and a method of achieving the advantages and characteristics will be clear by referring to exemplary embodiments described below in detail together with the accompanying drawings. However, the present disclosure is not limited to the exemplary embodiments disclosed herein but will be implemented in various forms. The exemplary embodiments are provided by way of example only so that those skilled in the art can fully understand the disclosures of the present disclosure and the scope of the present disclosure. Therefore, the present disclosure will be defined only by the scope of the appended claims.

The shapes, sizes, ratios, angles, numbers, and the like illustrated in the accompanying drawings for describing the exemplary embodiments of the present disclosure are merely examples, and the present disclosure is not limited thereto. Like reference numerals generally denote like elements throughout the specification. Further, in the following description of the present disclosure, a detailed explanation of known related technologies may be omitted to avoid unnecessarily obscuring the subject matter of the present disclosure. The terms such as "including," "having," and "consist of" used herein are generally intended to allow other components to be added unless the terms are used with the term "only". Any references to singular may include plural unless expressly stated otherwise.

Components are interpreted to include an ordinary error range even if not expressly stated.

When the position relation between two parts is described using the terms such as "on", "above", "below", and "next", one or more parts may be positioned between the two parts unless the terms are used with the term "immediately" or "directly".

When an element or layer is disposed "on" another element or layer, another layer or another element may be interposed directly on the other element or therebetween.

Although the terms "first", "second", and the like are used for describing various components, these components are not confined by these terms. These terms are merely used for distinguishing one component from the other components. Therefore, a first component to be mentioned below may be a second component in a technical concept of the present disclosure.

Like reference numerals generally denote like elements throughout the specification.

A size and a thickness of each component illustrated in the drawing are illustrated for convenience of description, and the present disclosure is not limited to the size and the thickness of the component illustrated.

The features of various embodiments of the present disclosure can be partially or entirely adhered to or combined with each other and can be interlocked and operated in technically various ways, and the embodiments can be carried out independently of or in association with each other.

Hereinafter, a display apparatus according to exemplary embodiments of the present disclosure will be described in detail with reference to accompanying drawings.

Display Device-Rollable Display Device

A rollable display device may also be referred to as a display device which is capable of displaying images even though the display device is rolled. The rollable display device may have a high flexibility as compared with a general display device of the related art. Depending on whether to use a rollable display device, a shape of the rollable display device may be freely varied. Specifically, when the rollable display device is not used, the rollable display device is rolled to be stored with a reduced volume. In contrast, when the rollable display device is used, the rolled rollable display device is unrolled to be used.

Figure 1B:
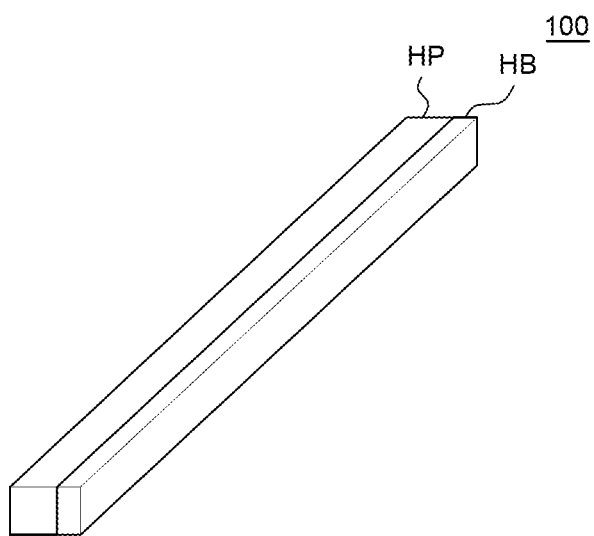

FIGS. 1A and 1B are perspective views of a display device according to an exemplary embodiment of the present disclosure.

Referring to FIGS. 1A and 1B, a display device 100 according to an exemplary embodiment of the present disclosure includes a display unit DP and a housing unit HP (which may also be referred to herein as a housing HP).

The display unit DP is a configuration for displaying images to a user and for example, in the display unit DP, a display element and a circuit, a wiring line, and a component for driving the display element may be disposed. In this case, since the display device 100 according to the exemplary embodiment of the present disclosure is a rollable display device 100, the display unit DP may be configured to be wound and unwound. For example, the display unit DP may be formed of a display panel and a back cover each having flexibility to be wound or unwound. The display unit DP will be described below in more detail with reference to FIGS. 3 and 4.

The housing unit HP is a case in which the display unit DP is accommodated. The display unit DP may be wound to be accommodated in the housing unit HP and the display unit DP may be unwound to be disposed at the outside of the housing unit HP.

The housing unit HP has an opening HPO through which the display unit DP moves to the inside and the outside of the housing unit HP. The display unit DP may move by passing through the opening HPO of the housing unit HP.

In the meantime, the display unit DP of the display device 100 may be switched from a fully unwound state to a fully wound state or from a fully wound state to a fully unwound state.

FIG. 1A illustrates the display unit DP of the display device 100 which is fully unwound and in the fully unwound state, the display unit DP of the display device 100 is disposed at the outside of the housing unit HP. That is, in order for a user to watch images through the display device 100, when the display unit DP is unwound to be disposed at the outside of the housing unit HP as much as possible and may not be further unwound any more, it may be defined as a fully unwound state.

FIG. 1B illustrates the display unit DP of the display device 100 which is fully wound and in the fully wound state, the display unit DP of the display device 100 is accommodated in the housing unit HP and may not be further wound. That is, when the user does not watch the images through the display device 100, it is advantageous from the viewpoint of an external appearance that the display unit DP is not disposed at the outside of the housing unit HP. Therefore, when the display unit DP is wound to be accommodated in the housing unit HP, it is defined as a fully wound state. Further, when the display unit DP is in a fully wound state to be accommodated in the housing unit HP, a volume of the display device 100 is reduced and the display device 100 may be easily carried.

Further, the display unit DP of the display device 100 may be switched from a fully wound state into a partially unwound state. The partially unwound state of the display unit DP may be defined as a state in which a part of the display unit DP is disposed at the outside of the housing unit HP.

Figure 2:
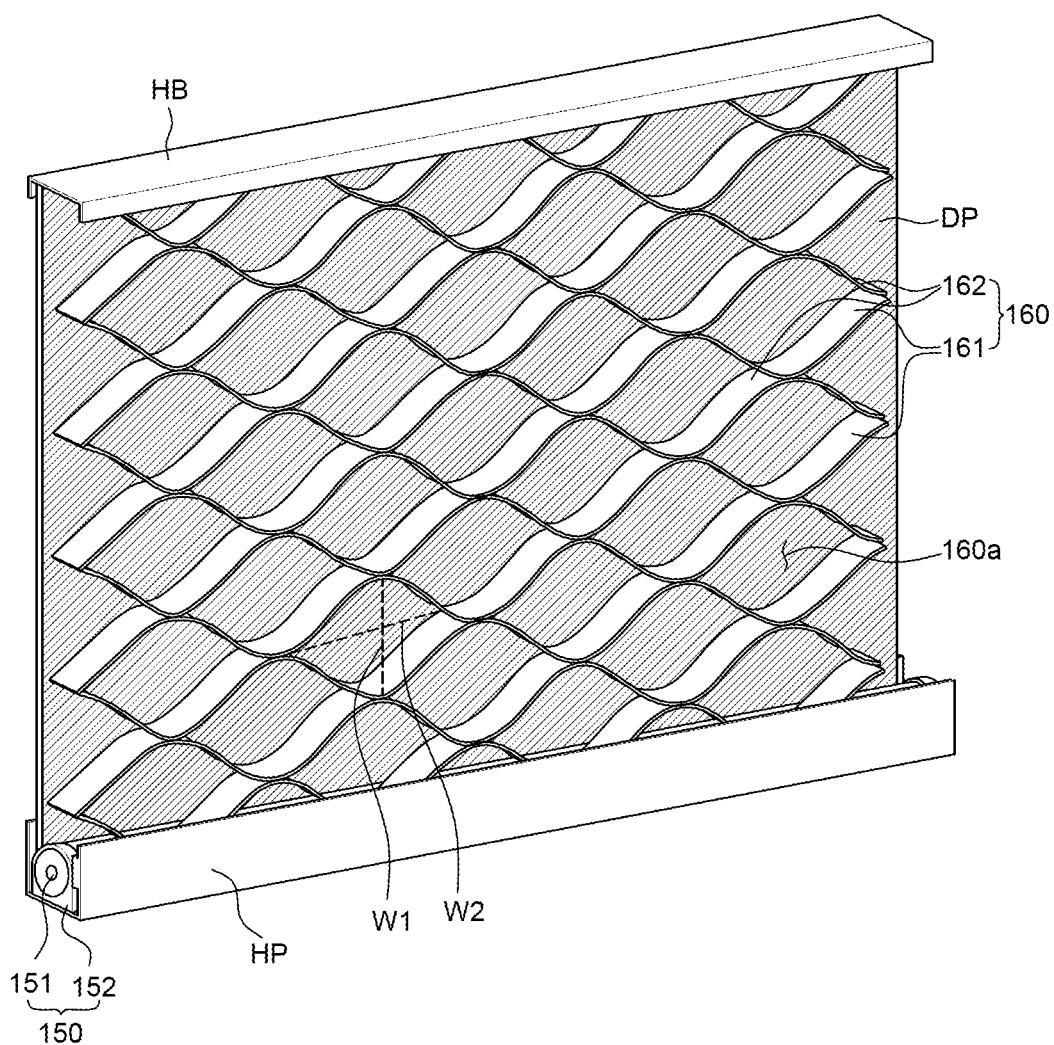
FIG. 2 is a perspective view of a display device according to an exemplary embodiment of the present disclosure.

FIG. 2 is a perspective view of a display device according to an exemplary embodiment of the present disclosure.

Referring to FIG. 2, the display device 100 includes a display unit DP, a housing unit HP, a head bar HB, a roller unit 150, and a support plate 160.

The head bar HB covers only a part of a surface of the display unit DP that is adjacent to an uppermost edge of the display unit DP so as not to hide an image displayed on the front surface of the display unit DP. The display unit DP and the head bar HB may be fixed by a screw, an adhesive, or the like, but are not limited thereto.

The roller 151 is accommodated in the housing unit HP to allow the display unit DP to be wound or unwound. Specifically, the roller 151 is accommodated in the housing unit HP so that a lower edge of the display unit DP is fixed to a part of the roller 151 and the roller 151 rotates in a clockwise direction or a counterclockwise direction to wind or unwind the display unit DP. For example, when the roller 151 rotates, the display unit DP may be wound while an opposite surface of a surface on which the screen is displayed is in close contact with the surface of the roller 151. In contrast, when the roller 151 rotates in an opposite direction, the display unit DP which is wound around the roller 151 may be unwound from the roller 151 to be disposed at the outside of the housing unit HP.

The display device 100 according to the exemplary embodiment of the present disclosure is a manually driven rollable display device in which the winding or unwinding operation is directly performed by a user using the hand. Specifically, in the display device 100, the user pulls the head bar HB from the housing unit HP so that the display unit DP is stretched. Therefore, when the user pulls the head bar HB from the housing unit HP, the display unit DP may be unwound from the roller 151 and when the user releases the head bar HB, the display unit DP may be fixed to be wound around or unwound from the roller 151. That is, the display device 100 according to the exemplary embodiment of the present disclosure does not include a separate driving unit which mechanically winds or unwinds the display unit DP.

Further, the roller 151 may more easily wind the display unit DP using an elastic member.

Specifically, the elastic member is disposed in the housing unit HP. Therefore, when the roller 151 rotates to unwind the display unit DP, the elastic member is compressed, and when a rotating force of the roller 151 is released, the elastic member rotates the roller 151 in an opposite direction using an elastic force to wind the display unit DP around the roller 151. At this time, a rotational force of the roller 151 which unwinds the display unit DP is applied to the display unit DP which is unwound from the roller 151, by an elastic force of the elastic member, and thus, the display unit DP exposed to the outside of the housing unit HP may maintain a flat state. The elastic member may be a spiral spring, but is not limited thereto.

The roller support unit 152 supports the roller 151 at both ends of the roller 151. Specifically, the roller support unit 152 is disposed on a bottom surface of the housing unit HP. Further, upper side surfaces of the roller support unit 152 are coupled to both ends of the roller 151. By doing this, the roller support unit 152 may support the roller 151 to be spaced apart from the bottom surface of the housing unit HP. In this case, the roller 151 may be rotatably coupled to the roller support unit 152.

In the meantime, even though in FIG. 2, it is illustrated that the roller 151 has a cylindrical shape whose cross section is of a circular shape, the roller 151 may have a cylindrical shape in which at least a part of an outer circumferential surface of the roller 151 is flat and the remaining part of the outer circumferential surface is curved. That is, a part of the outer circumferential surface of the roller 151 is formed to be flat and the remaining part of the outer circumferential surface may be formed to be curved.

Further, in some exemplary embodiments, the roller 151 may include a base and a top cover. For example, the base and the top cover are formed to have a cross section of a semi-circular shape so that when the base and the top cover are coupled, the roller 151 may have a cylindrical shape.

Further, in some exemplary embodiments, the display device 100 may further include a fixing tool which fixes a fully unwound state of the display unit DP when the display unit DP is fully unwound.

In addition, although the display device 100 described above has a housing unit and a head bar, the housing unit and the head bar may be optional elements of the display device, as long as one side of the support plate can be coupled to the display unit and the other side of the support plate can be coupled to the roller. For example, the head bar may be omitted, and the uppermost end of the support plate may be formed with a protrusion that is fixed to the upper side of the display unit. Similarly, the housing unit may be omitted, and the roller support unit may be formed with a bottom surface in addition to the upper side surfaces which are coupled to both ends of the roller, and this bottom surface can support the roller and the display unit wound to the roller.

Hereinafter, for the convenience of description, a display device having a housing unit and a head bar is taken as an example for description, but it is not limited thereto. Both the housing unit and the head bar are optional elements of the display device, and can be omitted with an appropriate configuration of the support plate and/or the roller.

Hereinafter, the display unit DP will be described in more detail with reference to FIGS. 3 and 4 together.

Display Unit

Figure 3:
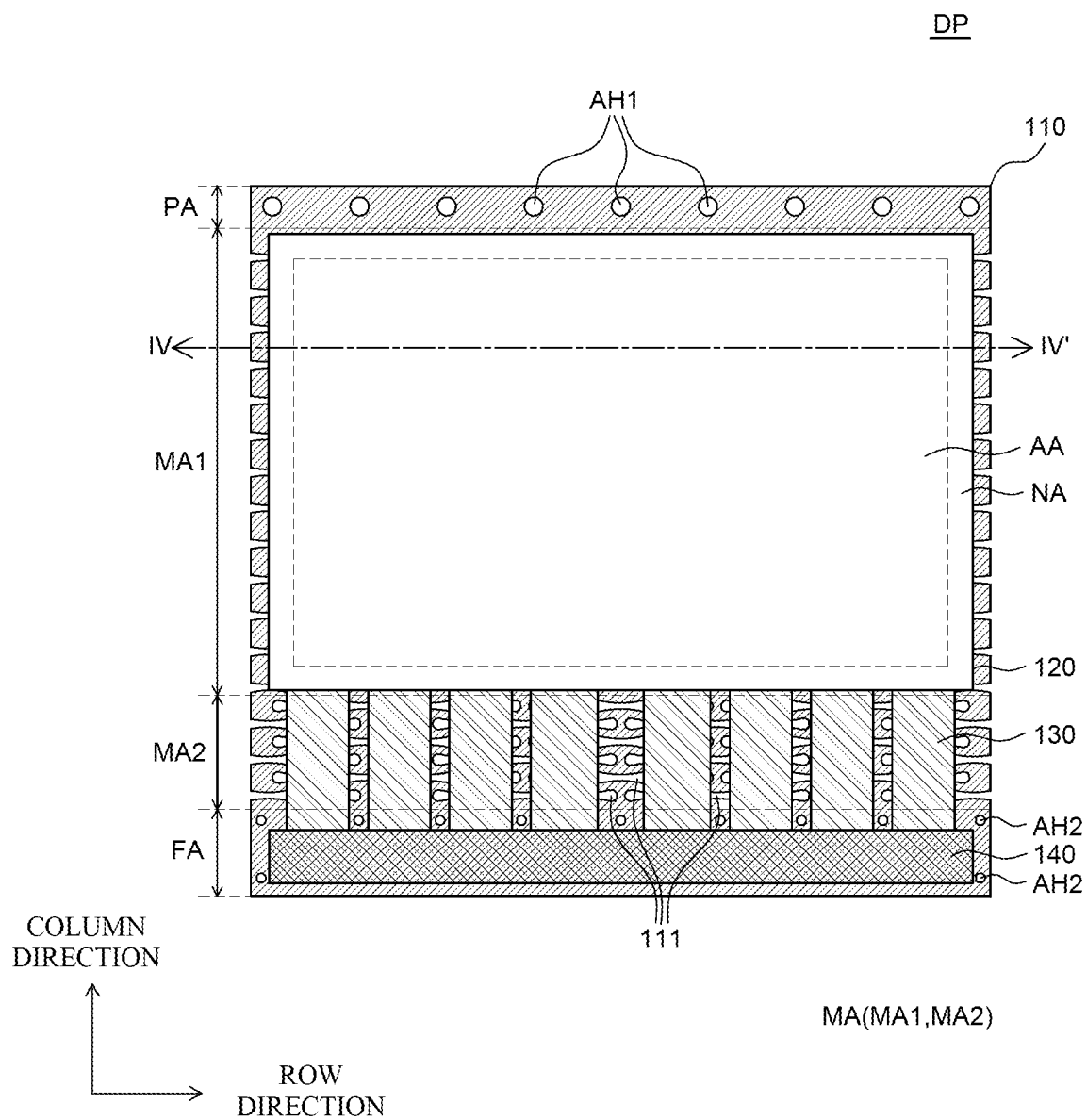
FIG. 3 is a plan view of a display unit of a display device according to an exemplary embodiment of the present disclosure.

FIG. 3 is a plan view of a display unit of a display device according to an exemplary embodiment of the present disclosure. FIG. 4 is a cross-sectional view taken along the line IV-IV' of FIG. 3.

Referring to FIG. 3, the display unit DP of the display device 100 (see FIG. 1A, 1B or 2, for example) includes a back cover 110, a display panel 120, a flexible film 130, and a printed circuit board 140.

The back cover 110 is disposed on rear surfaces of the display panel 120, the flexible film 130, and the printed circuit board 140 to support the display panel 120, the flexible film 130, and the printed circuit board 140. Therefore, a size of the back cover 110 may be larger than a size of the display panel 120. That is, an outer edge of the back cover 110 may be disposed outside more than a corresponding outer edge of the display panel 120. Therefore, when the display unit DP is disposed at the outside of the housing unit HP, the back cover 110 may protect another configuration of the display unit DP, specifically, the display panel 120, from the external impact.

Even though the back cover 110 is formed of a material having a rigidity, at least a part of the back cover 110 may have a flexibility to be wound or unwound together with the display panel 120. For example, the back cover 110 may be formed of a metal material such as steel use stainless (SUS) or invar or plastic. However, if the material of the back cover 110 satisfies physical conditions such as a thermal strain amount, a radius of curvature, and a rigidity, the material may be diversely changed, and is not limited thereto.

The back cover 110 includes a fixing area FA, a support area PA, and a malleable area MA. Specifically, the back cover 110 includes the support area PA at an uppermost end, the fixing area FA at a lowermost end, and the malleable area MA between the support area PA and the fixing area FA. In the support area PA, openings 111 are not disposed and a head bar HB (see FIG. 1A, 1B or 2, for example) is fastened with the support area PA. In the malleable area MA, a plurality of openings 111 are disposed, and the winding or unwinding is substantially performed by the malleable area MA. The fixing area FA is an area where the back cover 110 is fixed to the roller 151 together with the printed circuit board 140 and the flexible film 130.

The support area PA of the back cover 110 is an uppermost area of the back cover 110 and is fastened with the head bar HB. The support area PA may include first fastening holes AH1 through which the screw passes to be fastened with the head bar HB. Therefore, the head bar HB may be fastened with the support area PA of the back cover 110. Even though nine first fastening holes AH1 are illustrated in FIG. 3, the number of first fastening holes AH1 is not limited thereto. Further, even though it is described that the back cover 110 is fastened with the head bar HB using the first fastening holes AH1 in FIG. 3, it is not limited thereto and the back cover 110 and the head bar HB may be fastened with each other without using a separate fastening hole.

The fixing area FA of the back cover 110 is a lowermost area of the back cover 110 and is fastened with the roller 151. The fixing area FA may include second fastening holes AH2 through which a screw passes to be fastened with the roller 151. Therefore, the roller 151 may be fastened with the fixing area FA of the back cover 110. Further, as the fixing area FA is fastened with the roller 151, the back cover 110 may be wound around or unwound from the roller 151 by the rotation of the roller 151. In the meantime, the number of the plurality of second fastening holes AH2 illustrated in FIG. 3 is illustrative and the number of the plurality of second fastening holes AH2 may be determined based on the number of printed circuit board 140, the number of flexible films 130, and the like.

In the fixing area FA, the flexible film 130 which is connected to one end of the display panel 120 and the printed circuit board 140 are disposed to be fixed. Some of the second fastening holes AH2 through which the screw passes are disposed between the flexible films 130 to more stably fix the flexible films 130. A part of the roller 151 to which the fixing area FA is coupled may be formed to have a flat shape corresponding to the fixing area FA. For example, when a part of the roller 151 is formed to be flat, the flexible film 130 and the printed circuit board 140 disposed in the fixing area FA are also disposed in the roller 151 to be flat so that the damage of the flexible film 130 and the printed circuit board 140 may be suppressed.

The malleable area MA of the back cover 110 is an area which is wound around or unwound from the roller 151 together with the display panel 120. The malleable area MA may overlap partial areas of the display panel 120 and the flexible film 130.

The plurality of openings 111 is disposed in the malleable area MA of the back cover 110. When the display unit DP is wound or unwound, the plurality of openings 111 may be deformed by a stress which is applied to the display unit DP. Specifically, when the display unit DP is wound or unwound, the malleable area MA of the back cover 110 may be deformed as the plurality of openings 111 contracts or expands. Further, as the plurality of openings 111 contracts or expands, a slip phenomenon of the display panel 120 disposed on the malleable area MA of the back cover 110 is minimized so that the stress which is applied to the display panel 120 may be minimized.

In the meantime, in the support area PA and the fixing area FA, the plurality of openings 111 as formed in the malleable area MA is not formed. That is, in the support area PA and the fixing area FA, only the first fastening holes AH1 and the second fastening holes AH2 are formed, but the plurality of openings 111 as formed in the malleable area MA is not formed. Further, the first fastening holes AH1 and the second fastening holes AH2 may have different shapes from those of the plurality of openings 111. The support area PA and the fixing area FA which are fixed to the head bar HB and the roller 151, respectively, need to be rigider than the malleable area MA. Specifically, as the support area PA and the fixing area FA have rigidity, the support area PA and the fixing area FA may be firmly fixed to the head bar HB and the roller 151. Therefore, the display unit DP is fixed to the roller 151 and the head bar HB to be moved to the inside or the outside of the housing unit HP in accordance with the operation of the roller 151 and the head bar HB.

Referring to FIG. 3, the malleable area MA may include a first malleable area MA1 extending from the support area PA and a second malleable area MA2 between the first malleable area MA1 and the fixing area FA.

The first malleable area MA1 is an area in which a plurality of openings is disposed and the display panel 120 is attached. The second malleable area MA2 is an area extending from the first malleable area MA1 to the fixing area FA. In the second malleable area MA2, the plurality of openings 111 is disposed, but the display panel 120 is not disposed. Further, in the second malleable area MA2, at least a part of the flexible film 130 extending from the display panel 120 to the printed circuit board 140 is disposed.

The second malleable area MA2 extends to dispose the display area AA of the display panel 120 at the outside of the housing unit HP. For example, when the back cover 110 and the display panel 120 are fully unwound, the fixing area FA to which the printed circuit board 140 is attached to be fixed to the roller 151 to the second malleable area MA2 to which the flexible film 130 is attached may be disposed in the housing unit HP and the first malleable area MA1 and the support area PA to which the display panel 120 is attached may be disposed at the outside of the housing unit HP. In this case, when a length from the fixing area FA fixed to the roller 151 to the second malleable area MA2 is shorter than a length from the fixing area FA to the opening HPO of the housing unit HP, a part of the first malleable area MA1 to which the display panel 120 is attached may be disposed in the housing unit HP. Therefore, since a part of the lower end of the display area AA of the display panel 120 is disposed in the housing unit HP, it may be difficult to watch images. Therefore, the length from the fixing area FA fixed to the roller 151 to the second malleable area MA2 may be designed to be equal to the length from the fixing area FA fixed to the roller 151 to the opening HPO of the housing unit HP.

The display panel 120 is a panel for displaying images to a user. The display panel 120 may include a display element which displays images, a driving element which drives the display element, and wiring lines which transmit various signals to the display element and the driving element.

The display element may be defined in different ways depending on a type of the display panel 120. For example, when the display panel 120 is an organic light emitting display panel, the display element may be an organic light emitting diode which includes an anode, an organic light emitting layer, and a cathode. For example, when the display panel 120 is a liquid crystal display panel, the display element may be a liquid crystal display element. Further, when the display panel 120 is a light emitting display panel including an LED, the display element may be an LED. Hereinafter, even though the display panel 120 is assumed as an organic light emitting display panel, the display panel 120 is not limited to the organic light emitting display panel. Further, since the display device 100 according to the exemplary embodiment of the present disclosure is a rollable display device, the display panel 120 may be implemented as a flexible display panel to be wound around or unwound from the roller 151.

Referring to FIG. 3, the display panel 120 includes a display area AA and a non-display area NA.

The display area AA is an area where images are displayed in the display panel 120. In the display area AA, a plurality of sub pixels which configures the plurality of pixels and a driving circuit for driving the plurality of sub pixels may be disposed. The plurality of sub pixels is minimum units which configure the display area AA and a display element may be disposed in each of the plurality of sub pixels. For example, an organic light emitting diode which includes an anode, an organic light emitting layer, and a cathode may be disposed in each of the plurality of sub pixels, but it is not limited thereto. Further, a circuit for driving the plurality of sub pixels may include a driving element, a wiring line, and the like. For example, the circuit may be configured by a thin film transistor, a storage capacitor, a gate line, a data line, and the like, but is not limited thereto.

The non-display area NA is an area where no image is displayed. The non-display area NA is disposed so as to enclose an outer periphery of the display area AA. In the non-display area NA, various wiring lines and circuits for driving the organic light emitting diode of the display area AA are disposed. For example, in the non-display area NA, a link line which transmits signals to the plurality of sub pixels and circuits of the display area AA or a driving IC such as a gate driver IC or a data driver IC may be disposed, but the non-display area is not limited thereto.

The flexible film 130 is a film in which various components are disposed on a base film having a malleability. The flexible film 130 has a malleability so that a partial area may be wound around or unwound from the roller 151 together with the second malleable area MA2. The flexible film 130 supplies a signal to the plurality of sub pixels and the circuits of the display area AA and is electrically connected to the display panel 120. The flexible film 130 is disposed at one end of the non-display area NA of the display panel 120 to supply a power voltage, a data voltage, or the like to the plurality of sub pixels and the circuits of the display area AA. The number of flexible films 130 illustrated in FIG. 3 is illustrative and the number of flexible films 130 may vary depending on the design, but is not limited thereto.

In the meantime, for example, a driving IC such as a gate driver IC or a data driver IC may also be disposed on the flexible film 130. The driving IC is a component which processes data for displaying images and a driving signal for processing the data. The driving IC may be disposed by a chip on glass (COG), a chip on film (COF), or a tape carrier package (TCP) technique depending on a mounting method. However, for the convenience of description, it is described that the driving IC is mounted on the flexible film 130 by a chip on film manner, but is not limited thereto.

The printed circuit board 140 is disposed at one end of the flexible film 130 to be connected to the flexible film 130. The printed circuit board 140 is a component which supplies signals to the driving IC. The printed circuit board 140 supplies various signals such as a driving signal or a data signal to the driving IC. Various components may be disposed on the printed circuit board 140. For example, a timing controller, a power source unit, and the like may be disposed on the printed circuit board 140. Even though one printed circuit board 140 is illustrated in FIG. 3, the number of printed circuit boards 140 may vary depending on the design and is not limited thereto.

Figure 4:
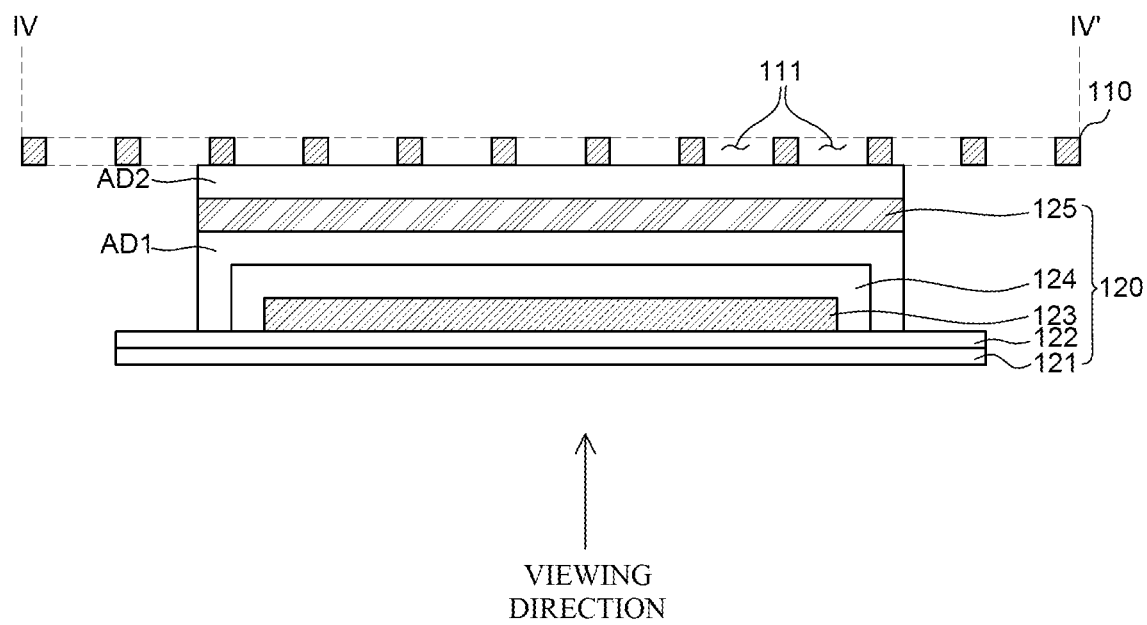
FIG. 4 is a cross-sectional view of a display unit of a display device according to an exemplary embodiment of the present disclosure.

Referring to FIG. 4, the display panel 120 includes a substrate 121, a buffer layer 122, a pixel unit 123, an encapsulation layer 124, and an encapsulation substrate 125.

The substrate 121 is a base member which supports various components of the display panel 120 and may be configured by an insulating material. The substrate 121 may be formed of a material having a flexibility to allow the display panel 120 to be wound or unwound and for example, may be formed of a plastic material such as polyimide (PI).

The buffer layer 122 may suppress moisture and/or oxygen which penetrates from the outside of the substrate 121 from being spread. The buffer layer 122 may be configured by a single layer or a double layer of silicon oxide SiOx and silicon nitride SiNx, but is not limited thereto.

The pixel unit 123 includes a plurality of organic light emitting diodes and a circuit for driving the plurality of organic light emitting diodes. The pixel unit 123 may be an area corresponding to the display area AA. The organic light emitting diode may include an anode, an organic light emitting layer, and a cathode.

The anode may supply holes to the organic light emitting layer and be formed of a conductive material having a high work function. For example, the anode may be formed of tin oxide (TO), indium tin oxide (ITO), indium zinc oxide (IZO), or indium zinc tin oxide (ITZO), but is not limited thereto.

The organic light emitting layer is supplied with holes from the anode and supplied with electrons from the cathode to emit light. The organic light emitting layer may be formed of a red organic light emitting layer, a green organic light emitting layer, a blue organic light emitting layer, a white organic light emitting layer, and the like depending on a color of light emitted from the organic light emitting layer. In this case, when the organic light emitting layer is a white organic light emitting layer, color filters having various colors may be additionally disposed.

The cathode may supply electrons to the organic light emitting layer and be formed of a conductive material having a low work function. For example, the cathode may be formed of any one or more selected from the group consisting of metals, such as magnesium (Mg), silver (Ag), and aluminum (Al), and an alloy thereof, but is not limited thereto.

In the meantime, the display panel 120 may be configured by a top emission type or a bottom emission type, depending on an emission direction of light which is emitted from the organic light emitting diode.

According to the top emission type, light emitted from the organic light emitting diode is emitted to an upper portion of the substrate 121 on which the organic light emitting diode is formed. In the case of the top emission type, a reflective layer may be formed below the anode to allow the light emitted from the organic light emitting diode to travel to the upper portion of the substrate 121, that is, toward the cathode.

According to the bottom emission type, light emitted from the organic light emitting diode is emitted to a lower portion of the substrate 121 on which the organic light emitting diode is formed. In the case of the bottom emission type, the anode may be formed only of a transparent conductive material and the cathode may be formed of the metal material having a high reflectance to allow the light emitted from the organic light emitting diode to travel to the lower portion of the substrate 121.

Hereinafter, for the convenience of description, the description will be made by assuming that the display device 100 according to an exemplary embodiment of the present disclosure is a bottom emission type display device, but it is not limited thereto.

A circuit for driving the organic light emitting diode is disposed in the pixel unit 123. The circuit may be formed of a thin film transistor, a storage capacitor, a gate line, a data line, a power line, and the like, but it may vary in various forms depending on the design of the display device 100.

The encapsulation layer 124 which covers the pixel unit 123 is disposed on the pixel unit 123. The encapsulation layer 124 seals the organic light emitting diode of the pixel unit 123. The encapsulation layer 124 may protect the organic light emitting diode of the pixel unit 123 from moisture, oxygen, impacts, and the like of the outside. The encapsulation layer 124 may be formed by alternately laminating a plurality of inorganic layers and a plurality of organic layers. For example, the inorganic layer may be formed of an inorganic material such as silicon nitride SiNx, silicon oxide SiOx, and aluminum oxide AlOx and the organic layer may use epoxy or acrylic-based polymer, but they are not limited thereto.

The encapsulation substrate 125 is disposed on the encapsulation layer 124. The encapsulation substrate 125 protects the organic light emitting diode of the pixel unit 123 together with the encapsulation layer 124. The encapsulation substrate 125 may protect the organic light emitting diode of the pixel unit 123 from moisture, oxygen, impacts, and the like of the outside. The encapsulation substrate 125 may be formed of a metal material, which has a high corrosion resistance and is easily processed in the form of a foil or a thin film, such as aluminum (Al), nickel (Ni), chromium (Cr), and an alloy material of iron (Fe) and nickel. Therefore, as the encapsulation substrate 125 is formed of a metal material, the encapsulation substrate 125 may be implemented as an ultra-thin film and provide a strong resistance against external impacts and scratches.

A first adhesive layer AD1 may be disposed between the encapsulation layer 124 and the encapsulation substrate 125. The first adhesive layer AD1 may bond the encapsulation layer 124 and the encapsulation substrate 125 to each other. The first adhesive layer AD1 is formed of a material having adhesiveness and may be a thermosetting or natural curable type adhesive. For example, the first adhesive layer AD1 may be formed of an optical clear adhesive (OCA), a pressure sensitive adhesive (PSA), or the like, but is not limited thereto.

In the meantime, the first adhesive layer AD1 may be disposed so as to enclose the encapsulation layer 124 and the pixel unit 123. That is, the pixel unit 123 may be sealed by the buffer layer 122 and the encapsulation layer 124, and the encapsulation layer 124 and the pixel unit 123 may be sealed by the buffer layer 122 and the first adhesive layer AD1. The first adhesive layer AD1 may protect the organic light emitting diode of the pixel unit 123 from moisture, oxygen, impacts, and the like of the outside together with the encapsulation layer 124 and the encapsulation substrate 125. In this case, the first adhesive layer AD1 may further include an absorbent. The absorbent may be particles having hygroscopicity and absorb moisture, oxygen, and the like from the outside to minimize permeation of the moisture and oxygen into the pixel unit 123.

The back cover 110 is disposed on the encapsulation substrate 125. The back cover 110 may be disposed to be in contact with the encapsulation substrate 125 of the display panel 120 to protect the display panel 120. In order to protect the display panel 120, the back cover 110 may be formed of a material having a rigidity.

A second adhesive layer AD2 may be disposed between the encapsulation substrate 125 and the back cover 110. The second adhesive layer AD2 may bond the encapsulation substrate 125 and the back cover 110 to each other. The second adhesive layer AD2 is formed of a material having adhesiveness and may be a thermosetting or natural curable type adhesive. For example, the second adhesive layer AD2 may be formed of an optical clear adhesive (OCA), a pressure sensitive adhesive (PSA), or the like, but is not limited thereto.

Even though in FIG. 4, it is illustrated that the plurality of openings 111 of the back cover 110 is not filled with the second adhesive layer AD2, the second adhesive layer AD2 may be filled in some or all of the plurality of openings 111. If the second adhesive layer AD2 is filled in the plurality of openings 111 of the back cover 110, a contact area between the second adhesive layer AD2 and the back cover 110 is increased so that a peel-off phenomenon may be avoided.

In the meantime, even though not illustrated in FIG. 4, a light-transmissive film may be further disposed on the entire substrate 121. The light-transmissive film may perform a function of protecting a front surface of the display panel 120 or minimizing the reflection of external light incident onto the display panel 120. For example, the light-transmissive film may be at least one of a polyethyleneterephthalate (PET) film, an anti-reflection film, a polarizer film, and a transmittance controllable film, but is not limited thereto.

Support Plate

Referring to FIG. 2 again, the support plate 160 is disposed on the rear surface of the display unit DP. The support plate 160 is disposed on a surface opposite to a surface of the display unit DP on which a screen is displayed, that is, a rear surface of the display unit DP. Further, one side of the support plate 160 is fixed to the head bar HB and the other side of the support plate 160 may be fixed to the housing unit HP. Therefore, the support plate 160 may be folded or unfolded as the display unit DP is wound or unwound. For example, when the display unit DP is wound around the roller 151, the support plate 160 may be folded and when the display unit DP is unwound from the roller 151, the support plate 160 may be unfolded. Further, when the display unit DP is fully unwound from the roller 151, the most of the support plate 160 is disposed in the housing unit HP to be enclosed by the head bar HB and the housing unit HP. Further, when the display unit DP is fully unwound from the roller 151, the support plate 160 may be disposed on the rear surface of the display unit DP with a mesh pattern.

The support plate 160 supports the display unit DP from the rear surface of the display unit DP. For example, when the display unit DP is fully unwound, the display unit DP may be unfolded to be partially bent. At this time, the support plate 160 supports the overall rear surface of the display unit DP to suppress the display unit DP from being partially bent. The support plate 160 may be formed of a metal or a plastic material, but is not limited thereto.

Referring to FIG. 2, the support plate 160 includes a plurality of first plates 161 and a plurality of second plates 162.

Some of the plurality of first plates 161 is fixed to the head bar HB and the housing unit HP. For example, one of the plurality of first plates 161 is fixed to the head bar HB and the other one of the plurality of first plates 161 may be fixed to the housing unit HP. At this time, the plurality of second plates 162 may be disposed to be adjacent to the plurality of first plates 161 fixed to the head bar HB and the housing unit HP.

The plurality of first plates 161 and the plurality of second plates 162 are alternately disposed. For example, the plurality of first plates 161 may be disposed in odd-numbered rows and the plurality of second plates 162 may be disposed in even-numbered rows. Therefore, the plurality of first plates 161 and the plurality of second plates 162 may be disposed to entirely form a mesh pattern. In the meantime, the plurality of first plates 161 and the plurality of second plates 162 may be disposed in a reverse manner. For example, the plurality of second plates 162 may be disposed in odd-numbered rows and the plurality of first plates 161 may be disposed in even-numbered rows.

The plurality of first plates 161 and the plurality of second plates 162 may be independently formed. The plurality of first plates 161 and the plurality of second plates 162 are separately formed to be partially bonded from each other by an adhesive material. For example, the plurality of first plates 161 and the plurality of second plates 162 are formed with a sinusoidal shape to be bonded at a point where peaks of the plurality of first plates 161 and valleys of the plurality of second plates 162 meet. That is, the plurality of first plates 161 and the plurality of second plates 162 are bonded at a plurality of points to configure the support plate 160. However, it is not limited thereto and the plurality of first plates 161 and the plurality of second plates 162 may be integrally formed.

The support plate 160 may include a plurality of openings 160a. Specifically, when the display unit DP is fully unwound, the support plate 160 is disposed on the rear surface of the display unit DP in a mesh pattern so that the plurality of openings 160a may be included. A width W1 of the plurality of openings 160a in a direction perpendicular to a moving direction of the display unit DP may be greater than a width W2 of the plurality of openings 160a in the moving direction of the display unit DP, for example, W1 being twice W2 or larger, and preferably W1 may be twice W2, but it is not limited thereto. Specifically, when the display panel of the display unit DP is wound, buckling is generated in the plurality of second plates 162 so that the plurality of openings 160a are closed (in a moving direction of the display unit DP) and the support plate 160 may be folded. At this case, when the width W1 of the plurality of openings 160a in a direction perpendicular to a moving direction of the display unit DP is equal to or smaller than the width W2 in the moving direction of the display unit DP, an elastic force of the support plate 160 may be increased in the moving direction of the display unit DP. Therefore, the support plate 160 may not be easily folded as the display panel is wound so that it may not be easy to repeatedly fold and unfold the support plate. Accordingly, the plurality of openings 160a are formed such that the width W1 of the plurality of openings 160a in a direction perpendicular to the moving direction of the display unit DP is larger than the width W2 in the moving direction of the display unit DP to reduce the elastic force of the support plate 160 in the moving direction of the display unit DP. By doing this, it may be easy for the support plate 160 to be flexibly deformed in accordance with the winding or unwinding of the display panel 120.

In a general manually driven rollable display device, the user directly pulls the head bar connected to the display panel from the housing unit to unfold the display panel. However, when the user directly pulls the display panel to be unfolded, the display panel may be partially bent due to the gravity. Specifically, the display panel does not have a separate structure on the rear surface to support the display panel so that it is difficult to fix a part between the housing unit and the head bar to be flat.

Therefore, the display device 100 according to the exemplary embodiment of the present disclosure disposes the support plate 160 on the rear surface of the display unit DP to fix the display panel DP to be flat when the display panel 120 is unwound. The support plate 160 is configured to be folded or unfolded as the display panel 120 is wound or unwound. For example, the support plate 160 is configured to be folded when the display panel 120 is wound and the support plate 160 may be unfolded to support the rear surface of the display unit when the display panel 120 is unwound. Specifically, when the display panel 120 is wound, the support plate 160 is disposed on the rear surface in a mesh pattern to uniformly support the entire rear surface of the display unit DP. Therefore, the support plate 160 supports a part of the display unit DP to be bent to support the rear surface of the display unit DP to fix the display panel 120 to be flat. Therefore, when the user uses the display device 100 which is unwound, a structure in which the display device 100 is firmly fixed to be maintained is provided so that the display device 100 according to the exemplary embodiment of the present disclosure may also improve the convenience of the user and the reliability.

Hole of Support Plate

Figure 5:
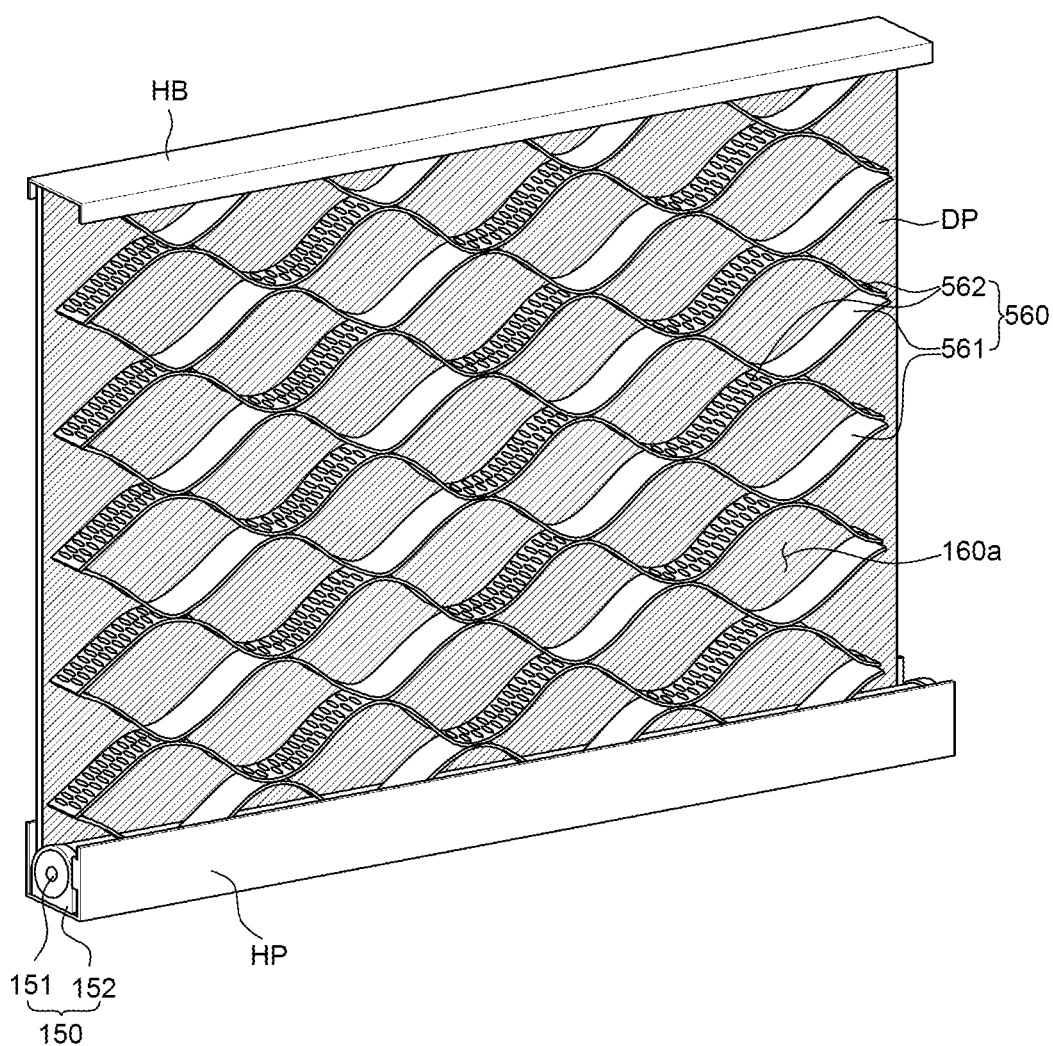
FIG. 5 is a perspective view of a display device according to another exemplary embodiment of the present disclosure.
Figure 6:
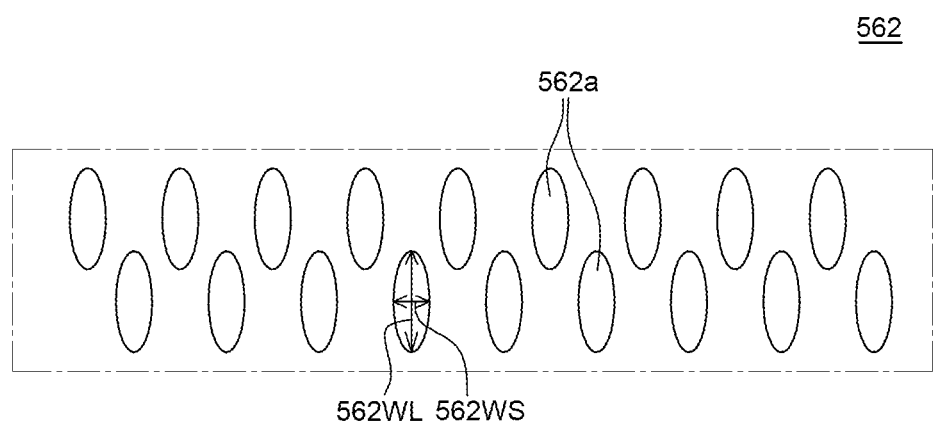
FIG. 6 is an enlarged plan view of a second plate of a display device according to another exemplary embodiment of the present disclosure.

FIG. 5 is a perspective view of a display device according to another exemplary embodiment of the present disclosure. FIG. 6 is an enlarged plan view of a second plate of a display device according to another exemplary embodiment of the present disclosure. The only difference between a display device 500 of FIGS. 5 and 6 and the display device 100 of FIGS. 1A to 4 is a support plate 560, but other configurations are substantially the same, so that a redundant description will be omitted.

Referring to FIGS. 5 and 6, the plurality of second plates 562 includes a plurality of holes 562a. The plurality of holes 562a is formed to have an oval shape and may be formed in the plurality of second plates 562. Even though in FIG. 6, it is illustrated that the plurality of holes 562a is alternately disposed in the plurality of second plates 562, it is not limited thereto so that the plurality of holes 562a may be disposed in parallel and also be irregularly disposed. Further, the plurality of holes 562a may be formed with various shapes such as a rectangular shape, a ribbon shape, a dumbbell shape, or a rhombus shape.

A width WL of the plurality of holes 562a in a short side direction of the plurality of second plates 562 is larger than a width WS of the plurality of holes 562a in a long side direction. Specifically, the plurality of second plates 562 is repeatedly rolled and unrolled with the same shape and opposite shape to that of the plurality of first plates 561 as the display panel 120 is wound or unwound, so that a stress may be generated in the plurality of second plates 562. At this time, when the width WL of the plurality of holes 562a in the short side direction of the plurality of second plates 562 is smaller than the width WS in the long side direction, it is difficult to disperse the stress generated in the plurality of second plates 562 and the elasticity of the plurality of second plates 562 may be stronger. Accordingly, the plurality of second plates 562 may not be flexibly deformed. Therefore, the width WL of the plurality of holes 562a in the short side direction of the plurality of second plates 562 is formed to be larger than the width WS in the long side direction. By doing this, when the display panel 120 is wound or unwound, the stress generated in the plurality of second plates 562 is reduced and the plurality of second plates 562 may be flexibly deformed.

In the display device 500 according to another exemplary embodiment of the present disclosure, the plurality of holes 562a is formed in the plurality of second plates 562 so that when the display unit DP is wound, buckling is generated in the plurality of second plates 562. Specifically, the support plate 560 is configured to be folded as the display panel 120 is wound. At this time, the plurality of second plates 562 disposed in the even-numbered rows is folded in accordance with the shape of the plurality of first plates 561 fixed to the head bar HB and the housing unit HP. Therefore, when the buckling, that is, the twisting is easily generated in the plurality of second plates 562, the support plate 560 may be easily folded. Accordingly, the plurality of holes 562a is formed in the plurality of second plates 562 to allow the plurality of second plates 562 to be easily deformed when the display panel 120 is wound, so that the support plate 560 may be easily folded.

Further, in the display device 500 according to another exemplary embodiment of the present disclosure, the width WL of the plurality of holes 562a in the short side direction of the plurality of second plates 562 is formed to be larger than the width WS in the long side direction so that the stress generated in the plurality of second plates 562 may be reduced. Specifically, the plurality of second plates 562 may be repeatedly folded and unfolded with the same shape and opposite shape to that of the plurality of first plates 561 as the display panel 120 is wound or unwound. At this time, the stress is generated in the short side direction of the plurality of second plates 562. Therefore, when the width WL of the plurality of holes 562a in the short side direction of the plurality of second plates 562 is formed to be larger than the width WS in the long side direction, the stress and the elasticity generated in the plurality of second plates 562 may be reduced. Accordingly, the width WL of the plurality of holes 562a in the short side direction of the plurality of second plates 562 is formed to be larger than the width WS in the long side direction. By doing this, when the display panel is wound or unwound, the stress and the elasticity generated in the plurality of second plates 562 are reduced so that the plurality of second plates 562 may be flexibly deformed.

Modulus of Support Plate

Figure 7:
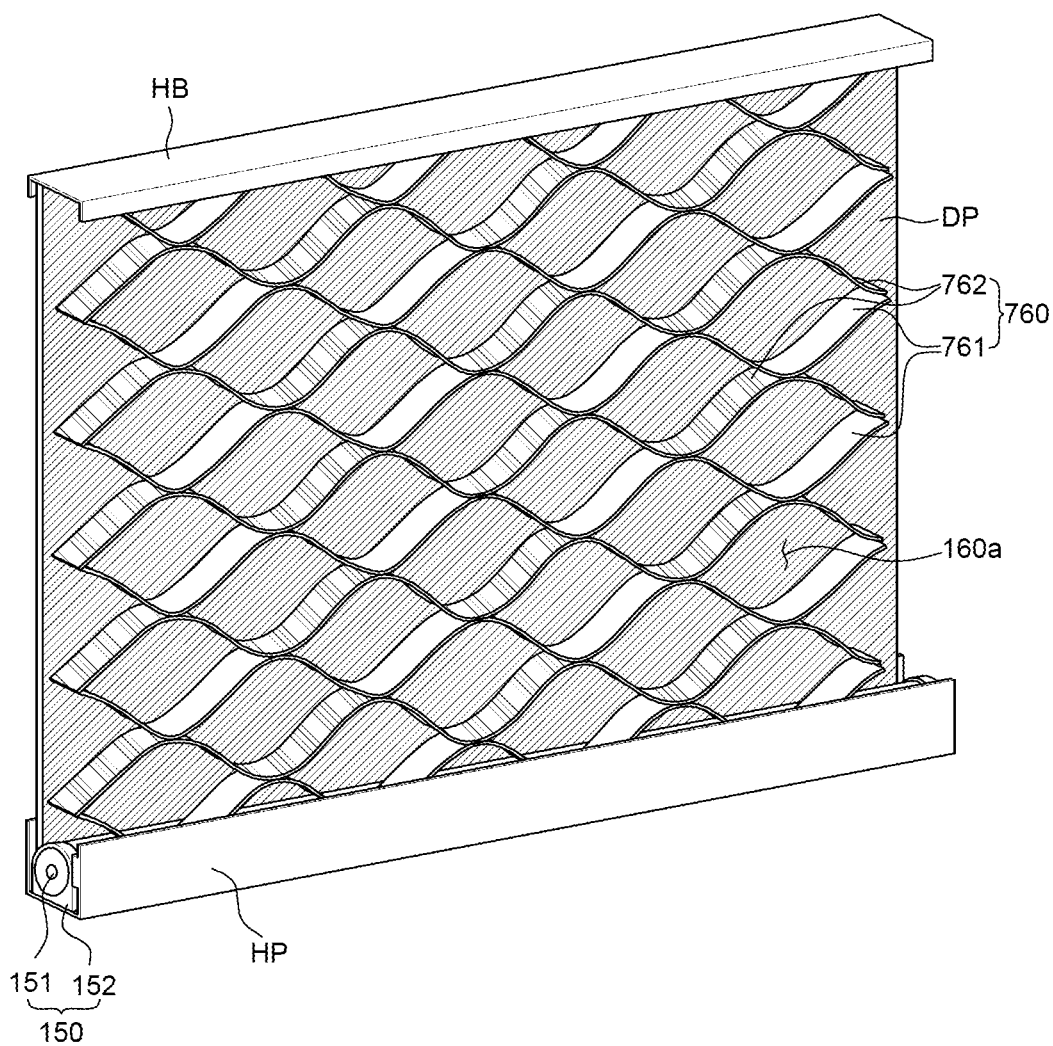
FIG. 7 is a perspective view of a display device according to still another exemplary embodiment of the present disclosure.

FIG. 7 is a perspective view of a display device according to still another exemplary embodiment of the present disclosure. The only difference between a display device 700 of FIG. 7 and the display device 100 of FIGS. 1 to 4 is a support plate 760, but other configurations are substantially the same, so that a redundant description will be omitted.

Referring to FIG. 7, a modulus of elasticity (which may also be referred to herein as a modulus unless the context clearly indicates otherwise) of the plurality of first plates 761 is larger than a modulus of the plurality of second plates 762. Specifically, when the plurality of first plates 761 is formed of a metal material, the plurality of second plates 762 may be formed of a material having a modulus smaller than that of the plurality of first plates 761, that is, may be formed of a material more flexible than the plurality of first plates 761. At this time, the modulus of the material of the plurality of second plates 762 may be 30% or lower of the modulus of the material of the plurality of first plates 761.

In the display device 700 according to still another exemplary embodiment of the present disclosure, the plurality of second plates 762 is formed of a material having a modulus smaller than a modulus of the plurality of first plates 761 to generate buckling in the plurality of second plates 762. Specifically, the support plate 760 is configured to be folded as the display panel 120 is wound. At this time, the plurality of second plates 762 disposed in the even-numbered rows is folded in accordance with the shape of the plurality of first plates 761 fixed to the head bar HB and the housing unit HP. Therefore, when the buckling, that is, the twisting is easily generated in the plurality of second plates 762, the support plate 760 may be easily rolled. Accordingly, the plurality of second plates 762 is formed of a material having a modulus lower than the modulus of the plurality of first plates 761 to allow the plurality of second plates 762 to be easily folded in accordance with the shape of the plurality of first plates 761.

Plurality of Guide Members

Figure 8:
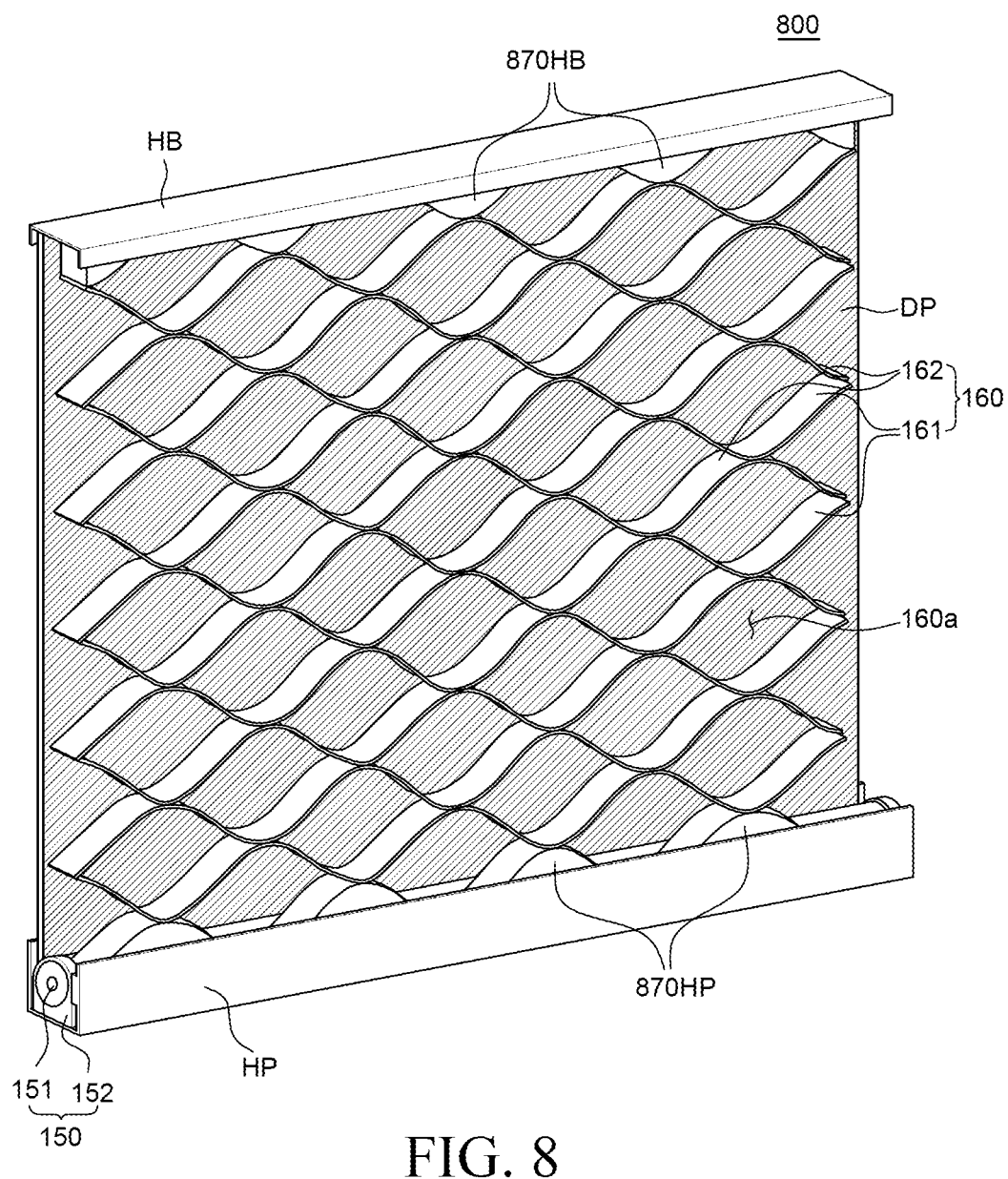
FIG. 8 is a perspective view of a display device according to still another exemplary embodiment of the present disclosure.
Figure 9:
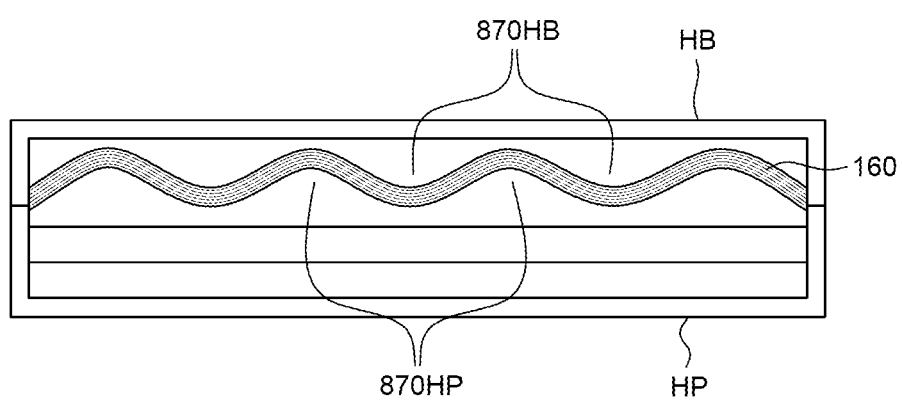
FIG. 9 is a cross-sectional view of a display device in which a display panel of FIG. 8 is fully wound.

FIG. 8 is a perspective view of a display device according to still another exemplary embodiment of the present disclosure. FIG. 9 is a cross-sectional view of a display device in which a display panel of FIG. 8 is fully wound. The only difference between a display device 800 of FIGS. 8 and 9 and the display device 100 of FIGS. 1A to 4 is that guide members 870HB and 870HP are added, but other configurations are substantially the same, so that a redundant description will be omitted.

Referring to FIG. 8, the head bar HB and the housing unit HP include a plurality of guide members 870HB and 870HP, respectively. The plurality of guide members 870HB and 870HP are disposed in the head bar HB and the housing unit HP, respectively, so that a part of the guide members is disposed inside the head bar HB and the housing unit HP and the other part may be disposed outside the head bar HB and the housing unit HP. In FIG. 8, it is illustrated that the plurality of guide members 870HB and 870HP are integrally formed with the head bar HB or the housing unit HP. However, the plurality of guide members 870HB and 870HP may be formed as separate configurations from the head bar HB or the housing unit HP to be fixed inside the head bar HB and the housing unit HP by means of a separate fixing member. Further, the number of the plurality of guide members 870HB and 870HP may vary depending on the design and the plurality of guide members 870HB and 870HP may be disposed only in a part of the head bar HB or the housing unit HP. Further, even though it is illustrated that the plurality of guide members 870HB and 870HP is disposed in both the head bar HB or the housing unit HP, the plurality of guide members 870HB and 870HP may be disposed only in the head bar HB or the housing unit HP.

Referring to FIGS. 8 and 9, shapes of the plurality of guide members 870HB of the head bar HB and the plurality of guide members 870HP of the housing unit HP correspond to a mesh pattern of the support plate 160 or shapes of openings of the support plate 160. More specifically, a shape of a lower surface of the plurality of guide members 870HB of the head bar HB and a shape of an upper surface of the plurality of guide members 870HP of the housing unit HP correspond to a mesh pattern of the support plate 160 or shapes of openings of the support plate 160. For example, when the support plate 160 is formed with a sinusoidal shape, the lower surface of the plurality of guide members 870HB of the head bar HB and the upper surface of the plurality of guide members 870HP of the housing unit HP may also be formed with a sinusoidal shape. Therefore, when the display panel 120 is wound, the support plate 160 may be folded while being guided along the shapes of the lower surface of the plurality of guide members 870HB of the head bar HB and the upper surface of the plurality of guide members 870HP of the housing unit HP.

Referring to FIGS. 8 and 9, the plurality of guide members 870HB of the head bar HB and the plurality of guide members 870HP of the housing unit HP are formed to correspond to each other. For example, when the plurality of guide members 870HB of the head bar HB and the plurality of guide members 870HP of the housing unit HP are formed with a sinusoidal shape, peaks of the plurality of guide members 870HB of the head bar HB and valleys of the plurality of guide members 870HP of the housing unit HP are formed in corresponding positions. Further, valleys of the plurality of guide members 870HB of the head bar HB and peaks of the plurality of guide members 870HP of the housing unit HP may be formed in corresponding positions. Therefore, as illustrated in FIG. 9, when the display panel 120 is fully wound, the peaks of the plurality of guide members 870HB of the head bar HB and the valleys of the plurality of guide members 870HP of the housing unit HP are engaged and valleys of the plurality of guide members 870HB of the head bar HB and peaks of the plurality of guide members 870HP of the housing unit HP may be engaged.

In the meantime, even though in FIGS. 8 and 9, it is illustrated that the plurality of guide members 870HB of the head bar HB and the plurality of guide members 870HP of the housing unit HP are formed with a sinusoidal shape, it is not limited thereto. Therefore, the plurality of guide members 870HB of the head bar HB and the plurality of guide members 870HP of the housing unit HP may be formed with any one of a triangular shape, a rectangular shape, and a circular shape.

In the meantime, in some exemplary embodiments, the support plate 160 fixed to the plurality of guide members 870HB and 870HP may include a plurality of holes 562a, like the plurality of second plates 562 of the support plate 560 of FIG. 5. Alternatively, the support plate 160 fixed to the plurality of guide members 870HB and 870HP may be formed of a material having a lower modulus, like the plurality of second plates 762 of the support plate 760 of FIG. 7. Therefore, when the display panel DP is wound, the support plate 160 may be more easily guided by the plurality of guide members 870HB of the head bar HB and the plurality of guide members 870HP of the housing unit HP.

In the display device 800 according to still another exemplary embodiment of the present disclosure, the plurality of guide members 870HB and 870HP is disposed in the head bar HB and the housing unit HP, so that when the display panel 120 is wound, a folding shape of the support plate 160 may be guided. Specifically, a shape of a lower surface of the plurality of guide members 870HB of the head bar HB and a shape of an upper surface of the plurality of guide members 870HP of the housing unit HP may be formed to correspond to a mesh pattern of the support plate 160. For example, when the support plate 160 is formed with a sinusoidal shape, the lower surface of the plurality of guide members 870HB of the head bar HB and the upper surface of the plurality of guide members 870HP of the housing unit HP may also be formed with a sinusoidal shape. Therefore, when the display panel 120 is wound, the support plate 160 may be folded while being guided along the shapes of the lower surface of the plurality of guide members 870HB of the head bar HB and the upper surface of the plurality of guide members 870HP of the housing unit HP.

Further, in the display device 800 according to still another exemplary embodiment of the present disclosure, the plurality of guide members 870HB of the head bar HB and the plurality of guide members 870HP of the housing unit HP may be formed to be engaged with each other. More specifically, a shape of the plurality of guide members 870HB of the head bar HB and a shape of the plurality of guide members 870HP of the housing unit HP may be such formed that the plurality of guide members 870HB and the plurality of guide members 870HP may be engaged with each other when the display panel of the display device 800 is wound. For example, when the plurality of guide members 870HB of the head bar HB and the plurality of guide members 870HP of the housing unit HP are formed with a sinusoidal shape, if the display device 800 is wound, peaks of the plurality of guide members 870HB of the head bar HB and valleys of the plurality of guide members 870HP of the housing unit HP may be engaged with each other. Further, valleys of the plurality of guide members 870HB of the head bar HB and peaks of the plurality of guide members 870HP of the housing unit HP may be engaged with each other. Therefore, when the display panel 120 is fully wound, the support plate 160 disposed between the plurality of guide members 870HB of the head bar HB and the plurality of guide members 870HP of the housing unit HP may be stably accommodated. Further, as a volume of the support plate 160 is minimized, a volume of the display device 800 may also be correspondingly minimized.

Display Device Including Driving Unit

Figure 10A:
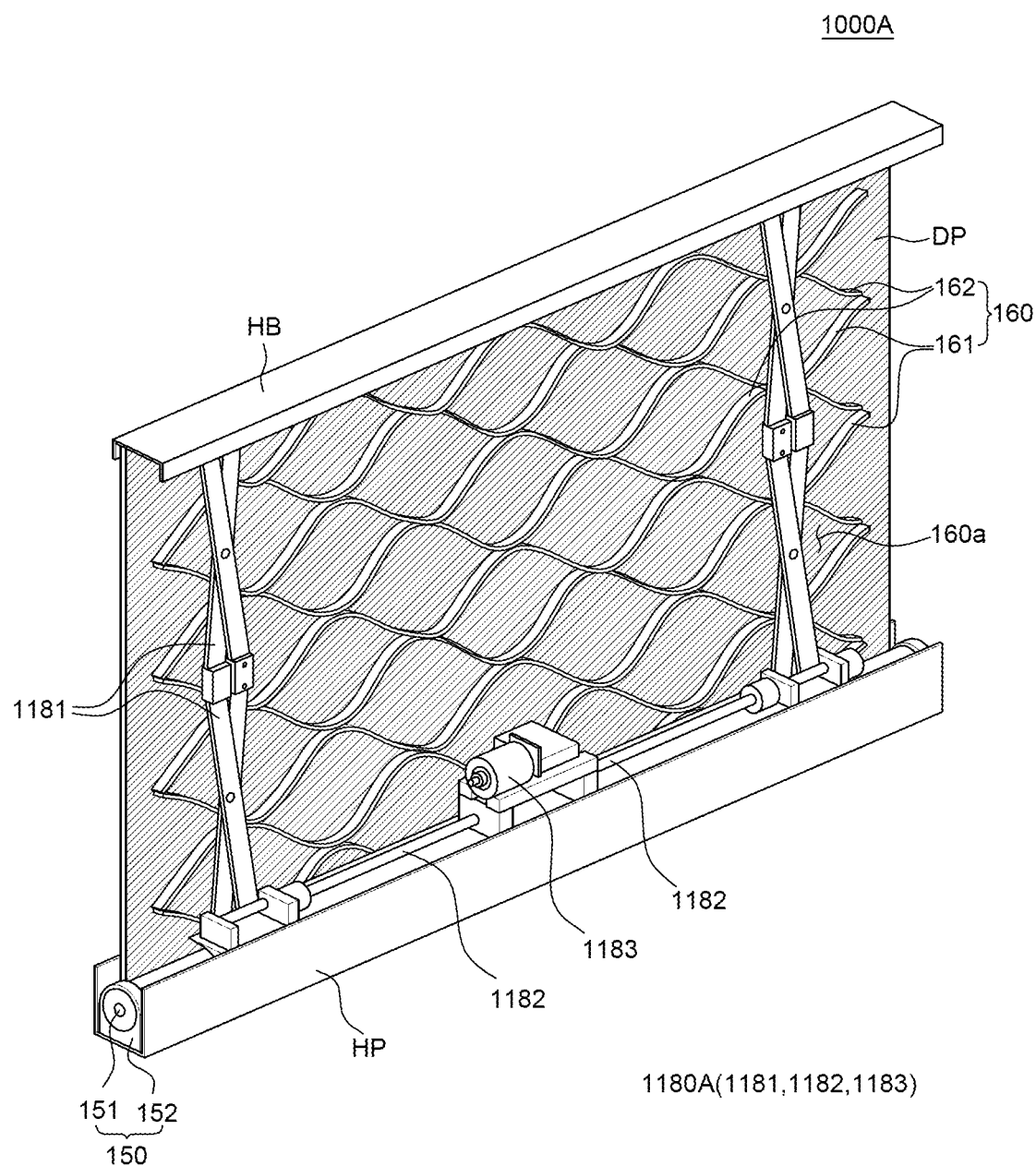
FIGS. 10A and 10B are perspective views of a display device according to still another exemplary embodiments of the present disclosure.
Figure 10B:
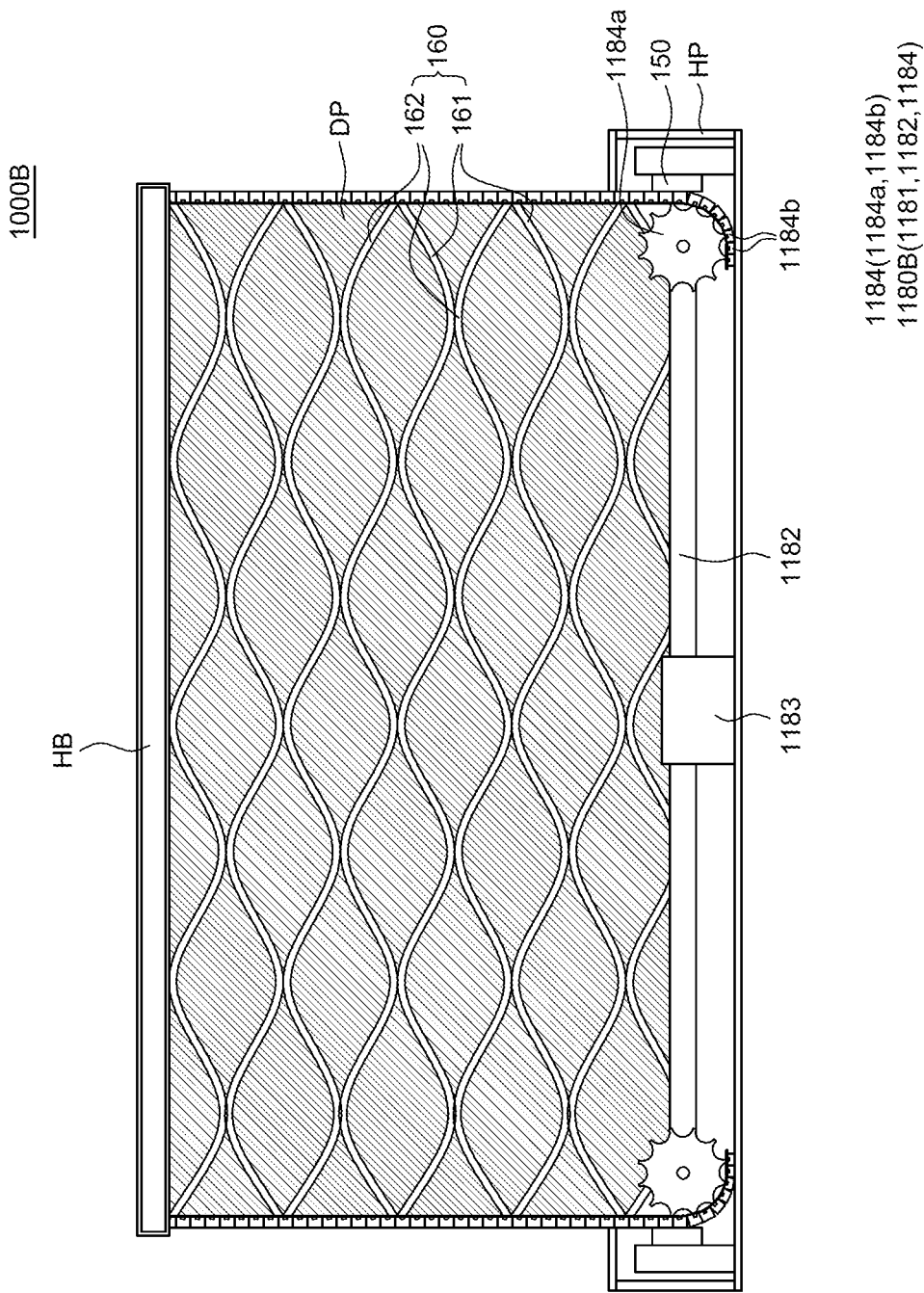

FIGS. 10A and 10B are perspective views of a display device according to still another exemplary embodiments of the present disclosure. The only difference between display devices 1000A and 1000B of FIGS. 10A and 10B and the display device 100 of FIGS. 1A to 4 is that driving units 1180A and 1180B are added, but other configurations are substantially the same, so that a redundant description will be omitted.

Referring to FIGS. 10A and 10B, display devices 1000A and 1000B include driving units 1180A and 1180B, respectively, which may also be referred to herein as driving assemblies 1180A and 1180B. The driving units 1180A and 1180B are disposed on the rear surface of the support plate 160 to drive the display panel 120 to be wound or unwound. For example, the driving units 1180A and 1180B may be configured with a link structure, a chain structure, or a block structure.

First, referring to FIG. 10A, the driving unit 1180A may be formed with a link structure. The link structure may include a link unit 1181, a rotary unit 1182, and a motor 1183. The link unit 1181 may be configured by a plurality of links. One end of the link unit 1181 is connected to the head bar HB and the other end of the link unit 1181 may be connected to the rotary unit 1182. Further, the link unit 1181 receives a driving force from the motor 1183 and the rotary unit 1182 connected to the motor 1183 to repeatedly perform a folding operation or an unfolding operation. Specifically, in accordance with the driving of the motor 1183, the rotary unit 1182 linearly moves and in accordance with the linear motion of the rotary unit 1182, the link unit 1181 may move in a vertical direction while crossing in a scissor shape. Therefore, the display unit DP connected to the head bar HB may move in a vertical direction in accordance with the vertical movement of the link unit 1181 and even though when the display unit DP is fully unwound, the display unit DP may be fixed in a flat state by the link unit 1181.

Next, referring to FIG. 10B, the driving unit 1180B may be formed with a chain structure. The chain structure may include a lifting unit 1184, a rotary unit 1182, and a motor 1183. The lifting unit 1184 may be configured by a sprocket 1184a and a plurality of unit blocks 1184b which is connected to each other by a plate. One end of the plurality of unit blocks 1184b is connected to the head bar HB to lift and lower the display unit DP in accordance with the rotation of the sprocket 1184a. Specifically, as the rotary unit 1182 transmits a rotational motion of the motor 1183 to the sprocket 1184*a*, the sprocket 1184*a* may rotate. Further, the plurality of unit blocks 1184*b* is engaged with the sprocket 1184*a* to move in a vertical direction in accordance with the rotation of the sprocket 1184*a*. Therefore, the display unit DP connected to the head bar HB may move in a vertical direction in accordance with the vertical movement of the plurality of unit blocks 1184*b* and even though when the display unit DP is fully unwound, the display unit DP may be fixed in a flat state by the lifting unit 1184. In the meantime, even though in FIG. 10B, it is illustrated that the lifting units 1184 are provided at a left side and a right side of the display unit DP, it is not limited thereto and only one lifting unit 1184 may be provided at the center of the display unit DP.

The display devices 1000A and 1000B according to still another exemplary embodiment of the present disclosure include the driving units 1180A and 1180B to implement large size display devices 1000A and 1000B. Specifically, when the size of the display devices 1000A and 1000B is increased, if the display unit DP is lifted or lowered, a tensile force and a compressive force may be increased. Therefore, the driving units 1180A and 1180B with a link structure, a chain structure, or a block structure are configured to supply a power to allow the link unit 1181 or the lifting unit 1184 to be lifted or lowered in accordance with a rotational motion of the motor 1183, thereby lifting or lowering the display unit DP.

The exemplary embodiments of the present disclosure can also be described as follows:

According to an aspect of the present disclosure, a display device includes: a display panel; a roller to which the display panel is wound or unwound; a housing unit which accommodates the display panel and the roller; a head bar connected to one end of the display panel; and a support plate which supports a rear surface of the display panel, has one side fixed to the head bar, and the other side fixed to the housing unit, and forms a mesh pattern.

The support plate may include a plurality of first plates and a plurality of second plates, the plurality of first plates and the plurality of second plates may be alternately disposed, and the plurality of first plates and the plurality of second plates may form a mesh pattern.

One of the plurality of first plates may be fixed to the head bar and the other one may be fixed to the housing unit and the plurality of second plates may include a plurality of holes.

A width of the plurality of holes in a short side direction of the plurality of second plates may be larger than a width in a long side direction of the plurality of second plates.

One of the plurality of first plates may be fixed to the head bar and the other one may be fixed to the housing unit and a modulus of the plurality of second plates may be smaller than a modulus of the plurality of first plates.

A modulus of a material which forms the plurality of second plates may be 30% or lower of a modulus of a material which forms the plurality of first plates.

The plurality of first plates and the plurality of second plates may be bonded at a plurality of points by an adhesive.

The plurality of first plates and the plurality of second plates may be integrally formed.

The head bar or the housing unit may include a plurality of guide members and the plurality of guide members may be formed to have any one of a triangular shape, a rectangular shape, a sinusoidal shape, and a circular shape.

A shape of the plurality of guide members of the head bar may be engaged with a shape of the plurality of guide members of the housing unit.

A shape of a lower surface of the plurality of guide members of the head bar and a shape of an upper surface of the plurality of guide members of the housing unit may correspond to the mesh pattern of the support plate.

When the display panel is fully wound, the support plate may be enclosed by the housing unit and the head bar.

The display device may further comprise an elastic member which is disposed in the housing unit to supply an elastic force for winding the display panel.

The display device may further comprise a back cover which is attached to the display panel between the display panel and the support plate and includes a plurality of openings.

The display device may further comprise a driving unit with a link structure, a chain structure, or a block structure configured to drive the display panel to be wound or unwound.

According to another aspect of the present disclosure, a display device may comprise a display panel which displays images; a back cover disposed on a rear surface of the display panel; a roller to which the back cover and the display panel is wound or unwound; a head bar fastened with the back cover; a housing unit which accommodates the display panel, the back cover, and the roller; and a support plate which is fastened with the head bar and the housing unit to support rear surfaces of the display panel and the back cover.

When the display panel is fully unwound, the support plate may form a mesh pattern including a plurality of openings and a width of the plurality of openings in a direction perpendicular to a moving direction of the display panel may be twice a width of the plurality of openings in the moving direction of the display panel.

The support plate may include a plurality of plates and among the plurality of plates, a plate adjacent to a plate which is fastened with the head bar and the housing unit may include a plurality of holes.

The support plate may include a plurality of plates and among the plurality of plates, a plate adjacent to a plate which is fastened with the head bar and the housing unit may be formed of a material having a modulus which is smaller than a modulus of the plate fastened with the head bar and the housing unit.

The head bar or the housing unit may include a plurality of guide members and the plurality of guide members may be formed to have any one of a triangular shape, a rectangular shape, a sinusoidal shape, and a circular shape.

Although the exemplary embodiments of the present disclosure have been described in detail with reference to the accompanying drawings, the present disclosure is not limited thereto and may be embodied in many different forms without departing from the technical concept of the present disclosure. Therefore, the exemplary embodiments of the present disclosure are provided for illustrative purposes only but not intended to limit the technical concept of the present disclosure. The scope of the technical concept of the present disclosure is not limited thereto. Therefore, it should be understood that the above-described exemplary embodiments are illustrative in all aspects and do not limit the present disclosure. The protective scope of the present disclosure should be construed based on the following claims, and all the technical concepts in the equivalent scope thereof should be construed as falling within the scope of the present disclosure.

The invention claimed is:

1. A display device, comprising:
a display panel;

a roller around which the display panel is wound or unwound;

a housing which accommodates the display panel and the roller;

a head bar connected to one end of the display panel; and a support plate which supports a rear surface of the display panel, the support plate having a mesh pattern with a first side of the support plate fixed to the head bar and a second side of the support plate fixed to the housing.

2. The display device according to claim 1, wherein the support plate includes a plurality of first plates and a plurality of second plates, the plurality of first plates and the plurality of second plates being alternately disposed, and the plurality of first plates and the plurality of second plates having the mesh pattern.

3. The display device according to claim 2, wherein a first one of the plurality of first plates is fixed to the head bar and a second one of the plurality of first plates is fixed to the housing and the plurality of second plates includes a plurality of holes.

4. The display device according to claim 3, wherein a width of the plurality of holes in a short side direction of the plurality of second plates is larger than a width of the plurality of holes in a long side direction of the plurality of second plates.

5. The display device according to claim 2, wherein a first one of the plurality of first plates is fixed to the head bar and a second one of the plurality of first plates is fixed to the housing and a modulus of elasticity of the plurality of second plates is less than a modulus of elasticity of the plurality of first plates.

6. The display device according to claim 2, wherein a modulus of elasticity of a material of the plurality of second plates is 30% or less than a modulus of elasticity of a material of the plurality of first plates.

7. The display device according to claim 2, wherein the plurality of first plates and the plurality of second plates are bonded at a plurality of points by an adhesive.

8. The display device according to claim 2, wherein the plurality of first plates and the plurality of second plates are a single, unitary, integral structure.

9. The display device according to claim 1, wherein the head bar or the housing includes a plurality of guide members having any one of a triangular shape, a rectangular shape, a sinusoidal shape, and a circular shape.

10. The display device according to claim 9, wherein the head bar and the housing each include a respective plurality of guide members, a shape of the plurality of guide members of the head bar engaged with a shape of the plurality of guide members of the housing.

11. The display device according to claim 9, wherein the head bar and the housing each include a respective plurality of guide members, a shape of a lower surface of the plurality of guide members of the head bar and a shape of an upper surface of the plurality of guide members of the housing corresponding to the mesh pattern of the support plate.

12. The display device according to claim 1, wherein the support plate is enclosed by the housing and the head bar in response to the display panel being fully wound around the roller.

13. The display device according to claim 1, further comprising:

an elastic member which is disposed in the housing and structured to supply an elastic force for winding the display panel.

14. The display device according to claim 1, further comprising:

a back cover which is attached to the display panel between the display panel and the support plate and includes a plurality of openings.

15. The display device according to claim 1, further comprising:

a driving assembly with a link structure, a chain structure, or a block structure configured to wind and unwind the display panel.

16. A display device, comprising:

a display panel structured to display images;

a back cover disposed on a rear surface of the display panel;

a roller around which the back cover and the display panel are wound or unwound;

a head bar fastened with the back cover;

a housing which accommodates the display panel, the back cover, and the roller; and a support plate which is fastened to the head bar and the housing to support the rear surface of the display panel and a rear surface of the back cover.

17. The display device according to claim 16, wherein the support plate has a mesh pattern including a plurality of openings in response to the display panel being fully unwound, and a width of the plurality of openings in a direction perpendicular to a movement direction of the display panel is twice a width of the plurality of openings in the movement direction of the display panel.

18. The display device according to claim 16, wherein the support plate includes a plurality of plates including a first plate having a plurality of holes adjacent to a second plate fastened with the head bar or the housing.

19. The display device according to claim 16, wherein the support plate includes a plurality of plates including a first plate adjacent to a second plate, the second plate fastened with the head bar or the housing, the first plate including a material having a modulus of elasticity less than a modulus of elasticity of the second plate.

20. The display device according to claim 16, wherein the head bar or the housing includes a plurality of guide members having any one of a triangular shape, a rectangular shape, a sinusoidal shape, and a circular shape.

* * * * *